US010692162B2

(12) United States Patent
Schmidt (10) Patent No.: US 10,692,162 B2
(45) Date of Patent: Jun. 23, 2020

(54) MANAGING A LEGAL HOLD ON CLOUD DOCUMENTS

(75) Inventor: Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 1008 days.

(21) Appl. No.: 13/543,254

(22) Filed: Jul. 6, 2012

(65) Prior Publication Data

US 2014/0012767 A1 Jan. 9, 2014

(51) Int. Cl.
*G06Q 50/18* (2012.01)

(52) U.S. Cl.
CPC .................. *G06Q 50/18* (2013.01)

(58) Field of Classification Search
CPC ............................. G06Q 10/107; G06Q 50/18
USPC ........................................................ 705/311
See application file for complete search history.

(56) References Cited

U.S. PATENT DOCUMENTS

| 7,895,229 | B1 * | 2/2011 | Paknad | 707/769 |
|---|---|---|---|---|
| 8,037,029 | B2 * | 10/2011 | DeBie et al. | 707/662 |
| 8,219,974 | B2 | 7/2012 | Schmidt | |
| 8,572,043 | B2 * | 10/2013 | Pogodin | 707/661 |
| 2007/0168350 | A1 * | 7/2007 | Utiger | 707/10 |
| 2008/0294492 | A1 * | 11/2008 | Simpson et al. | 705/9 |
| 2009/0043819 | A1 * | 2/2009 | Searl et al. | 707/104.1 |
| 2009/0150168 | A1 * | 6/2009 | Schmidt | 705/1 |
| 2009/0150866 | A1 * | 6/2009 | Schmidt | 717/120 |
| 2009/0327021 | A1 * | 12/2009 | Paknad | 705/9 |
| 2010/0299763 | A1 * | 11/2010 | Marcus et al. | 726/30 |
| 2010/0333116 | A1 * | 12/2010 | Prahlad et al. | 719/328 |
| 2011/0093471 | A1 * | 4/2011 | Brockway et al. | 707/747 |
| 2012/0198073 | A1 * | 8/2012 | Srikanth et al. | 709/226 |
| 2012/0254134 | A1 * | 10/2012 | Talati et al. | 707/695 |

OTHER PUBLICATIONS

Rangan, Venkat ("E-Discovery and the Cloud: The Duty to Preserve Electronically Stored Information (ESI)"), May 28, 2009, <<http://www.clearwellsystems.com/e-discovery-blog/2010/05/28/e-discovery-and-the-cloud-the-duty-to-preserve-electronically-stored-information-esi/>>, pp. 5.*

Manghani, Amit "Key Characteristics of a PaaS Offering", Cloudbook, vol. 2, 2011: Issue 1, <http://media.cloudbook.net/pdf/key-characteristics-of-paas.pdf> p. 1-3.*

'Cloud Computing' [online]. Wikipedia, 2011, [retrieved on Jan. 13, 2014]. Retrieved from the Internet: <URL: http://en.wikipedia.org/w/index.php?title=Cloud_computing&oldid=437218354>, 19 pages.

(Continued)

*Primary Examiner* — Aryan E Weisenfeld
(74) *Attorney, Agent, or Firm* — Fish & Richardson P.C.

(57) ABSTRACT

A computer-implemented method for managing a legal hold on cloud documents includes: implementing, on a cloud platform configured to store documents and perform one or more services for respective tenants, a legal-hold framework; receiving legal-hold information in the legal-hold framework, the legal-hold information specifying at least one document, indicating a legal hold applicable to modification or deletion of the document, and identifying a legal action; and in response to receiving the legal-hold information, updating a legal-hold index with an identifier for the document and updating legal-hold metadata with the identity of the legal action.

19 Claims, 5 Drawing Sheets

(56) References Cited

OTHER PUBLICATIONS

'SAP Unveils accelerated cloud strategy' [online]. SAP, 2012, [retrieved on Jan. 13, 2014]. Retrieved from the Internet: <URL: http://www.news-sap.com/sap-unveils-accelerated-cloud-strategy/>, 3 pages.
'Cloud storage' [online]. Wikipedia, 2011, [retrieved on Jan. 13, 2014]. Retrieved from the Internet: <URL: http://en.wikipedia.org/w/index.php?title=Cloud_storage&oldid=438920561>, 3 pages.
'Platform as a service' [online]. Wikipedia, 2011, [retrieved on Jan. 13, 2014]. Retrieved from the Internet: <URL: http://en.wikipedia.org/w/index.php?title=Cloud_storage&oldid=438920561>, 3 pages.
'Legal hold' [online]. Wikipedia, 2011, [retrieved on Jan. 13, 2014]. Retrieved from the Internet: <URL: http://en.wikipedia.org/w/index.php?title=Cloud_storage&oldid=438920561>, 3 pages.
Discovery (law) [online]. Wikipedia, 2011, [retrieved on Jan. 13, 2014]. Retrieved from the Internet: <URL: http://en.wikipedia.org/w/index.php?title=Cloud_storage&oldid=438920561>, 5 pages.

\* cited by examiner

MANAGING A LEGAL HOLD ON CLOUD DOCUMENTS

BACKGROUND

When an organization is expecting to be the target of a legal action, it may be obligated to stop destruction of all documents and records which pertain to the upcoming litigation. This does not only affect data stored inside a corporate network, but also data stored by utilized cloud services (e.g. DropBox like services where various types of data can be stored). Serious consequences can follow if a company fails to comply with a duty to preserve such evidence.

Legal hold is a commonly used term for a process by which an organization must preserve and prepare all forms of documents, including, electronic communication when litigation is anticipated or confirmed. This usually involves information retention management strategies.

SUMMARY

In a first aspect, a computer-implemented method for managing a legal hold on cloud documents includes: implementing, on a cloud platform configured to store documents and perform one or more services for respective tenants, a legal-hold framework; receiving legal-hold information in the legal-hold framework, the legal-hold information specifying at least one document, indicating a legal hold applicable to modification or deletion of the document, and identifying a legal action; and in response to receiving the legal-hold information, updating a legal-hold index with an identifier for the document and updating legal-hold metadata with the identity of the legal action.

In a second aspect, a computer program product is tangibly embodied in a computer-readable storage medium and includes instructions that when executed by a processor perform a method for managing a legal hold on cloud documents. The method includes: implementing, on a cloud platform configured to store documents and perform one or more services for respective tenants, a legal-hold framework; receiving legal-hold information in the legal-hold framework, the legal-hold information specifying at least one document, indicating a legal hold applicable to modification or deletion of the document, and identifying a legal action; and in response to receiving the legal-hold information, updating a legal-hold index with an identifier for the document and updating legal-hold metadata with the identity of the legal action.

Implementations can include any or all of the following features. The method further includes presenting a graphical user interface using the legal-hold framework, wherein a user enters the legal-hold information using the graphical user interface. The method further includes receiving legal-hold release information in the legal-hold framework, and in response thereto at least removing the identifier for the document from the legal-hold index. The method further includes detecting, in the legal-hold framework, that one of the services generates a request to perform a modification or deletion of a stored document; determining, in response to the detection, whether the stored document is identified in the legal-hold index; and if so, denying the request. The method further includes receiving a legal-hold lookup request in the legal-hold framework, the legal-hold lookup request identifying a particular legal hold; in response to the legal-hold lookup request, obtaining identifiers from the legal-hold index for any documents covered by the particular legal hold; and making the documents covered by the particular legal hold available to a user who submitted the legal-hold lookup request. The method further includes receiving, in the legal-hold framework, information indicating a new document type for the legal hold of the identified legal action; and updating a document type registry with the received information. The method further includes implementing, in the legal-hold framework, a first service configured for uploading documents to, and accessing the documents in, another cloud platform; and configuring, based on the received legal-hold information, the first service to update the legal-hold index regarding the documents and to check the legal-hold index before document modification or deletion.

In a third aspect, a computer program product is embodied in a non-transitory computer-readable storage medium, the computer program product including instructions that, when executed, generate on a display device a graphical user interface for managing a legal hold on cloud documents. The graphical user interface includes: a first input control for entering legal-hold information in a legal-hold framework on a cloud platform configured to store documents and perform one or more services for respective tenants, the legal-hold information specifying at least one document, indicating a legal hold applicable to modification or deletion of the document, and identifying a legal action; and a second input control for entering legal-hold release information causing the legal-hold framework to at least removing an identifier for the document from a legal-hold index.

Implementations can include any or all of the following features. The graphical user interface further includes: a third input control for entering a legal-hold lookup request in the legal-hold framework, the legal-hold lookup request identifying a particular legal hold, wherein identifiers are obtained from the legal-hold index for any documents covered by the particular legal hold; and a document presentation area that makes the documents covered by the particular legal hold available to a user who submitted the legal-hold lookup request. The graphical user interface further includes: a third input control for entering information indicating a new document type for the legal hold of the identified legal action, wherein a document type registry is updated with the received information.

Implementations can provide any or all of the following advantages. A legal-hold definition and lookup framework can be implemented in a cloud platform. A user can conveniently define a legal hold, release the hold when no longer applicable, ensure that the legal hold is taken into account before document deletion or modification, and look up documents with a legal hold that match certain criteria. Management of a legal hold can be simplified and made more flexible.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques that support legal hold operations in a cloud environment. Such a framework allows legal holds to be defined for data stored by a cloud platform and prevents affected data from being deleted or modified. In some implementations legal hold functionality is provided as a generic building block of a cloud service.

Figure 1:
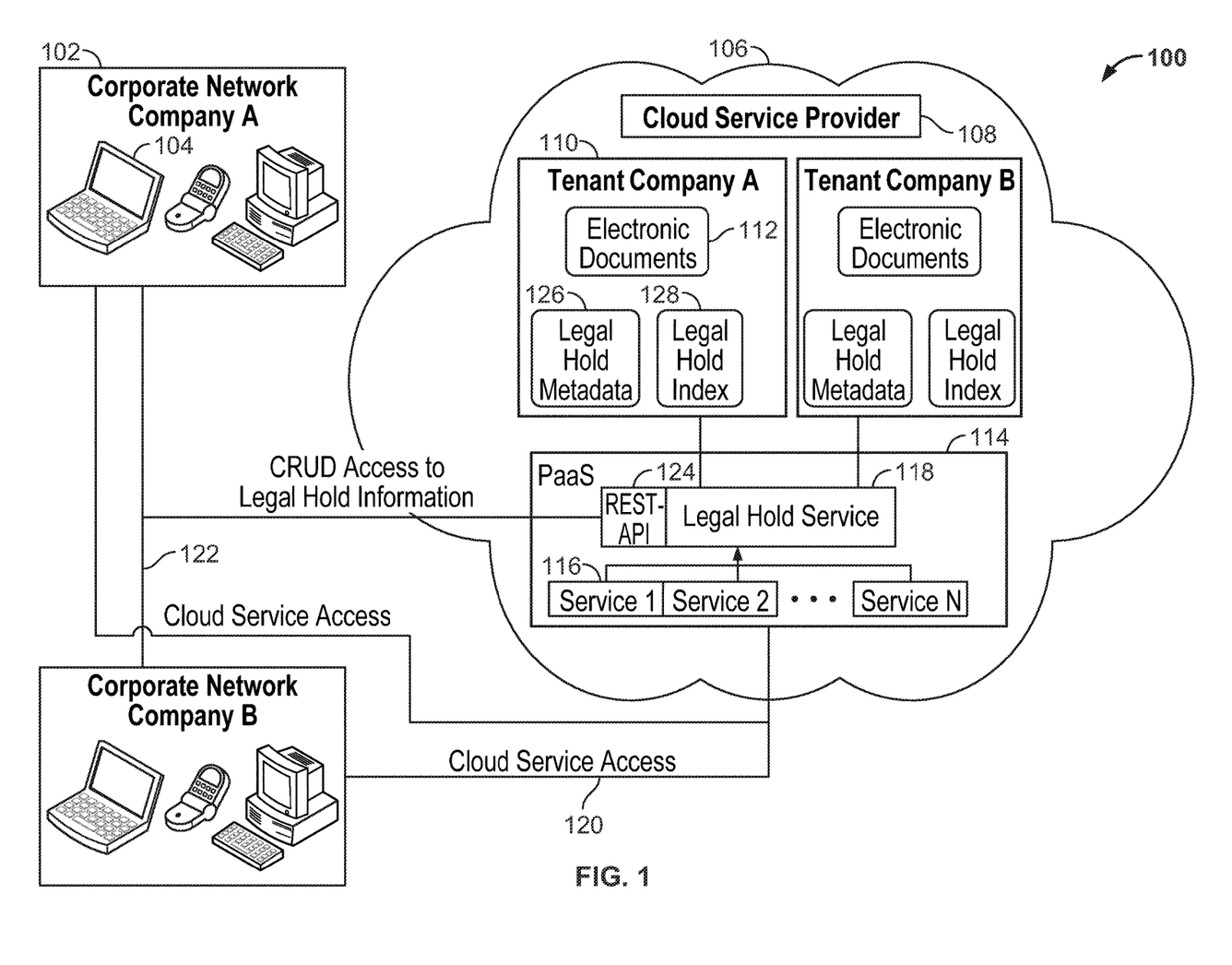
FIG. 1 shows an example of a system that can be used for managing a legal hold on cloud documents.

FIG. 1 shows an example of a system 100 that can be used for managing a legal hold on cloud documents. Two corporate networks 102 are illustrated in this example, but more or fewer networks can be used in some implementations. Each of the corporate networks 102 is associated with one or more companies or other organizations. In this example, they are referred to as companies A and B, respectively. For example, the company A or B can be a business organization that uses an enterprise resource planning (ERP) system to manage some or all aspects of its activities.

Each of the corporate networks 102 can be configured to have one or more devices 104 operated by users. The device 104 can include, but is not limited to, a laptop computer, a smartphone, a desktop computer, a handheld device, a musical instrument or a game console, to name just a few examples. In some implementations, a user can operate one or more of the devices 104 to create, modify and review documents or other electronic records.

The system 100 includes a cloud 106 that can be used for storing documents and records, and for providing one or more services to the companies A and B or others. Any suitable cloud computing technology can be used for the cloud 106. For example, the cloud 106 can offer computing services, storage services and cloud infrastructure services. In this implementation, a cloud service provider component 108 is included in the cloud 106 for use by the operator of the cloud to manage the various aspects of the cloud activities. For example, the cloud service provider component can be used to implement a legal-hold framework in the cloud.

The cloud 106 recognizes one or more tenants 110 with regard to which its storage or other services are performed. For example, each of the companies A and B, or others, can be considered a tenant in the cloud 106. The tenant has access to some or all of the cloud's services and can use storage space, in some instances up to a maximum amount. Here, for example, each of the tenants 110 has electronic documents 112 stored so that they are available only to that tenant and are separate from any documents or other information regarding other tenants. The tenant can use the cloud as a secure and conveniently accessible location for its business information. The electronic documents can include any suitable types of documents or other electronic records, including, but not limited to, text documents, spreadsheets, image data, graphs, diagrams, business documents, messages, emails or audio data, to name just a few examples.

Here, the cloud 106 includes a platform-as-a-service (PaaS) 114 which is the infrastructure and is the foundation for the services provided to the tenants. The PaaS can offer the companies A and B, or others, the ability to deploy applications or other solutions without having to own or operate the underlying platform. The PaaS can provide one or more services 116 to each tenant. Here, the services are labeled 1, 2, . . . N. For example, some of the services 116 can relate to creation, uploading, editing or deletion of, or access to, the electronic documents 112. The services 116 can be applied across multiple tenants.

The PaaS 114 includes a legal hold service (LHS) 118 that supports legal-hold operations in the cloud 106. In some implementations, some or all of the services 116 can be required to go via the LHS before modifying or deleting any document. For example, this can allow the LHS to block the modification or deletion if the document is covered by a legal hold. Generally, the network(s) 102 can use a cloud service access 120 to upload, create, modify or delete documents in the cloud 106, subject to the legal-hold restrictions imposed using the LHS 118.

Also, the network(s) 102 can use an access 122 to the LHS 118 through at least one application programming interface (API) 124. In some implementations, the API 124 can be a representational state transfer (REST) based interface to the LHS. More than one API can be defined, including, but not limited to, a key-definition API (e.g., for new document types), a lookup API, a legal-hold definition API, a legal-hold release API or a legal-hold check API. For example, due to an open structure of the framework API implementations for new document types can be integrated and registered.

For example, all operations supported by the LHS can be exposed for outside consumption based on a REST-style architecture; all APIs provided by the legal-hold framework can be exposed via one or more REST-based services. Using the REST architecture, customer-specific user interfaces can be implemented for legal-hold management.

In some implementations, a developer can use software development kits to develop new interfaces for the LHS 118. Such interfaces can support create, read, update and delete (CRUD) operations. This can use the standardized OData protocol for data exchange. For example, mobile devices can be supported by building lightweight mobile applications based on REST and OData. The REST-based APIs can also be used by various applications to request information regarding a legal hold. For example, a retention management software used by a customer of a cloud service provider can run in the customer's local network. In such a context the LHS 118 can be used to consider cloud data for retention management. For example, the LHS can be used to determine whether a destruction job of electronic data that is scheduled due to a defined retention policy would affect data placed under the legal hold, and if so can cause the retention management software to prevent the destruction.

Here, each of the tenants 110 is illustrated as having legal-hold metadata 126 and a legal-hold index 128. The legal-hold metadata includes metadata relevant to one or more legal holds applicable to the corresponding tenant. This metadata can include, but is not limited to, the name of the pending legal case, an identifier for the case, a reason for the legal hold (e.g., a judge's order or an applicable rule), a creator of the legal hold, descriptive keywords, or applicable dates, to name just a few examples.

The legal-hold index 128 identifies the documents or other electronic records that are subject to the legal hold. The legal-hold index can be implemented as an index for fast lookup of documents. In some implementations, the lookup uses a multidimensional hashing algorithm to calculate hash keys for unique keys of documents or objects with different types. Each legal hold stored in the legal-hold index includes, or is otherwise associated with, a reference to the legal-hold metadata 126 to identify the corresponding legal action. That is, when a legal hold is declared and the system 100 is being updated accordingly, the legal-hold index 128 can be created (or an existing index extended) so that it identifies all existing documents covered by the legal hold.

In some implementations, documents are created using one or more applications installed in the corporate network (s) 102, which can provide an upload service to the cloud. For example, when a document is created in a mobile device the API 124, which can be http-based, can be used for CRUD operations (e.g., the access 122) via http.

Newly created documents can be monitored for potentially being covered by one or more legal holds. In some implementations, the framework can be extended so that a check-in mechanism is performed. Documents can be parsed with regard to content, author or location of creation, to name just a few examples. In such implementations, the legal-hold metadata 124 can be extended with legal terms, names, timestamps, dates, or other data, and the parsing can look for occurrences thereof.

Figure 2:
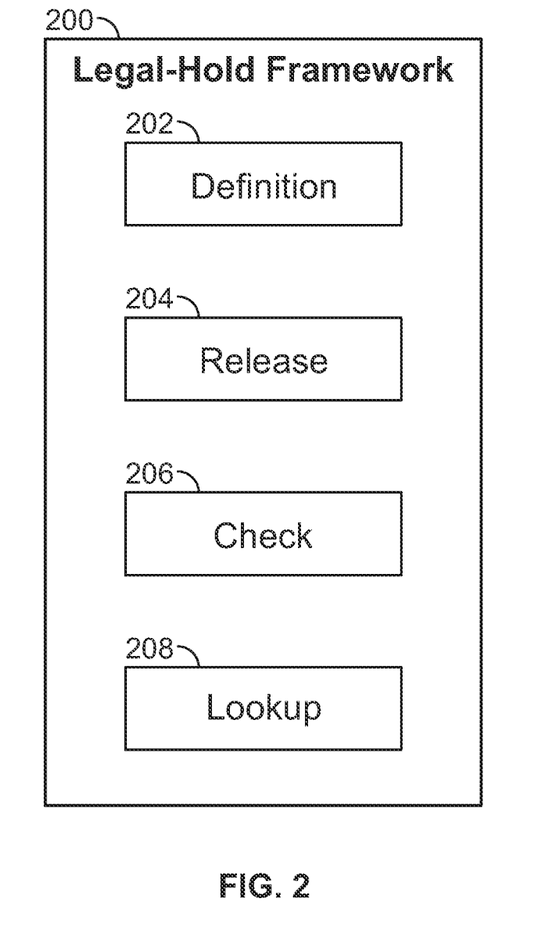
FIG. 2 shows an example of a legal-hold framework.

FIG. 2 shows an example of a legal-hold framework 200. The legal-hold framework can be implemented using any suitable combination of software, hardware or firmware, for example in the cloud 106 (FIG. 1). In short, the legal-hold framework allows a user to define a legal hold, release the hold when no longer applicable, ensure that the legal hold is taken into account before document deletion or modification, and look up documents with a legal hold that match certain criteria.

The legal-hold framework 200 includes a definition component 202 for a legal hold. For example, the definition component enables the user to define a legal hold for a particular document or documents, or for a type of document. A release component 204 allows a user to release the legal hold, for example with regard to a particular document or set of documents, when the underlying legal proceeding is terminated. A check component 206 generally serves to implement the legal hold(s) in effect. For example, the check component can determine whether a legal hold applies to a document for which a modification or deletion is requested. A lookup component 208 allows a user to identify and access particular documents affected by a legal hold. For example, the lookup component can provide searching for documents matching one or more criteria, including, but not limited to, by creation date, creation service, document type, author, identification number or by keyword, to name just a few examples.

One example of documents that can be affected by a legal hold is email and other electronic communications. In some implementations, the legal-hold framework 200 applies a legal hold against emails that are created or delivered using an exchange server (not shown) that is located in the cloud 106. For example, the email exchange server can be extended to use the LHS 118 (FIG. 1).

Figure 3:
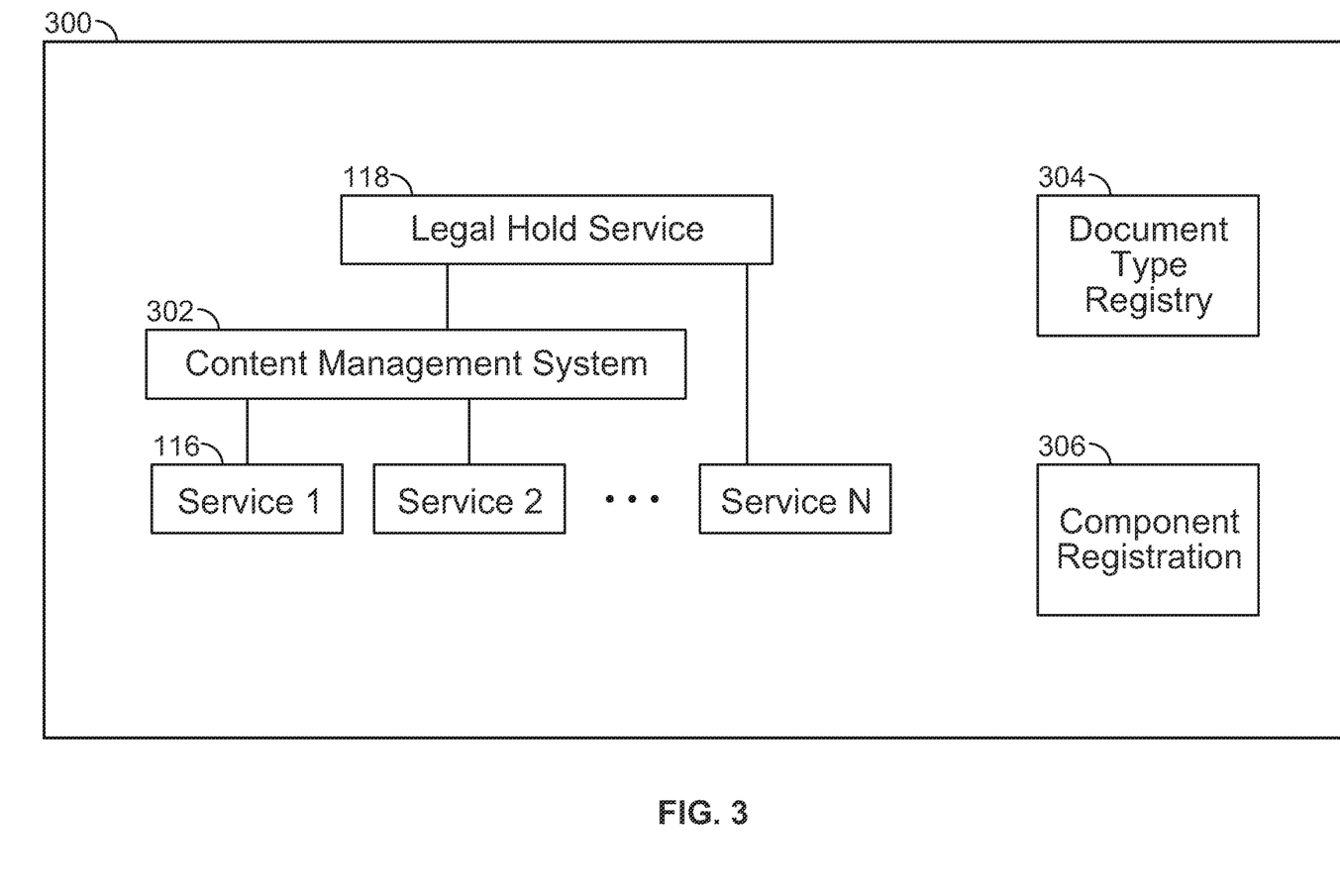
FIG. 3 shows another example of a system that can be used for managing a legal hold on cloud documents.

FIG. 3 shows another example of a system 300 that can be used for managing a legal hold on cloud documents. In some implementations, the system 300 can be used for the legal-hold framework 200 (FIG. 2). Similar to the PaaS 114 (FIG. 1), the system 300 includes the LHS 118 and the individual services 116 that were described in that example.

Here, however, the system 300 also includes at least one content management system (CMS) 302 that is a layer above the electronic documents 112 (FIG. 1) and that can use the LHS 118. The CMS can provide a core service, such as an electronic content management service, store documents in respective repositories for the different tenants, and maintain the metadata and the index. For example, one of the services 116 (e.g., service 1) can trigger a call to the CMS, which in turn uses the LHS. The CMS and the LHS are tightly coupled in such implementations, and the LHS can then be considered one of the core services of the cloud platform (e.g., the PaaS 114 in FIG. 1). In some implementations, when the CMS is used for storing a document, this can trigger a check API to parse the document for keywords or other information that might indicate the document is covered by an existing legal hold.

The above example having the CMS 302 between the services 116 and the LHS 118 can be contrasted with another implementation (e.g., as shown in FIG. 1) where each of the services 116 can directly use the LHS 118. However, in some implementations using the CMS one or more of the services 116 (in this example, the one called service N) can bypass the CMS and directly use the LHS, for example if such service does not delete or modify documents.

The documents or other electronic records (e.g., the electronic documents 112 in FIG. 1) that are covered by a legal hold can be of one or more types. The system 300 here includes a document type registry 304 that acts as a central registry for the supported document types. The registry allows integration of one or more new types of document into the legal-hold framework 200 (FIG. 2) by implementing APIs. In some implementations, the registry 304 stores information regarding the document types to which the legal-hold process applies, and also the corresponding API implementations that the framework calls to execute the supported legal-hold operations for a particular document type. For example, the document type registry can be used to incorporate an email server into the cloud for a legal-hold scenario.

Documents outside the cloud can also be covered by a legal hold. The system 300 here includes a component registration module 306 that allows software modules (e.g., cloud platform services) and hardware components (e.g., a storage system) to be registered. In such implementations, when legal-hold information is updated, the module 306 can notify the registered components so that they can react accordingly (e.g., by releasing the hold). The component registration module supports a push-channel of alerts, so that notifications can be pushed to registered clients (e.g., to mobile devices). For example, a registered storage system can initiate a mass-destruction process for a large number of documents stored therein as soon as a legal hold is released.

The component registration module 306 allows a legal hold to be applied to documents stored in another cloud service. For example, one of the services 116 can allow uploading of documents (e.g., text, images or other data) to one or more external cloud platforms. The legal-hold index 128 (FIG. 1) could then also contain identifiers for, or other references to, such documents in non-local clouds.

Figure 4:
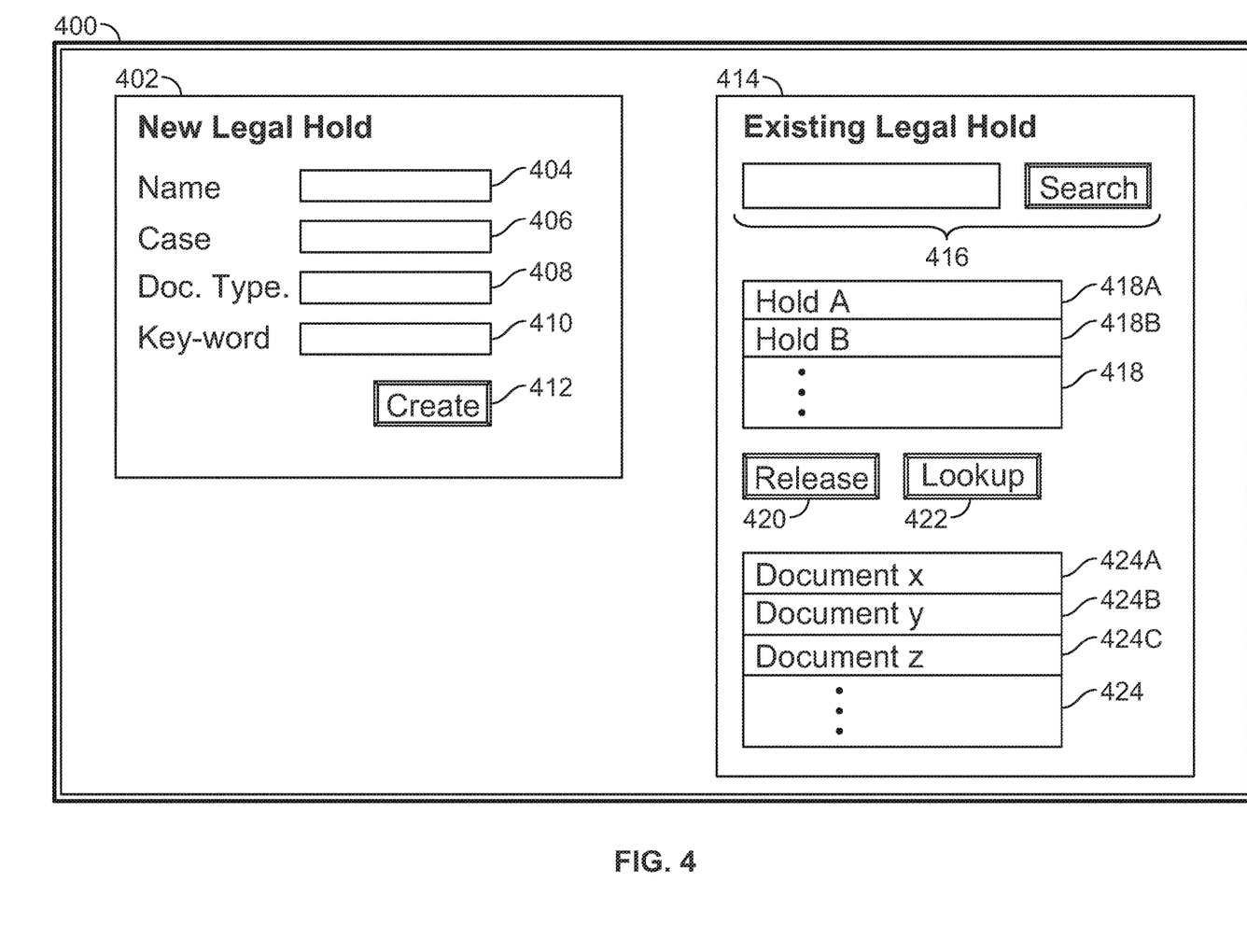
FIG. 4 shows an example of a graphical user interface that can be used for managing a legal hold on cloud documents.

FIG. 4 shows an example of a graphical user interface (GUI) 400 that can be used for managing a legal hold on cloud documents. The GUI includes a new legal-hold area 402 where a user can enter information in one or more fields, for example: a name of the legal hold (404), a case number (406) for the underlying legal process, one or more document types (408) covered by the legal hold, or one or more keywords (410). When a create control 412 is activated, the new legal hold is created in the system. For example, the legal-hold index 128 (FIG. 1) can be created and the legal-hold metadata 126 (FIG. 1) can be updated. The legal hold is created with regard to one or more specific tenants. For example, the identity of the user creating the legal hold can determine to which tent(s) it will be applied.

The GUI 400 also includes an area 414 for existing legal holds, such as those that have previously been created using the area 402. The area 414 includes a search function 416 where the user can look for legal holds using one or more keywords or other criteria.

Such criteria can include, but are not limited to, the name of the case, the nature of the underlying legal action, topics covered by the legal hold, or the author's name, to list just a few examples. Results of such searching can be presented in a legal-hold area 418. For example, the legal-hold area currently lists legal holds A and B, as indicated by identifiers 418A and B, respectively.

A release function 420 can be used to release one or more legal holds. In some implementations, when the legal action is terminated or the legal hold otherwise expires, the user can select the legal hold in the legal-hold area 418 and thereafter generate the command that causes the legal hold to be released. For example, such release can be conditioned by significant security measures and/or extensive double checking so that a legal hold is not inadvertently released.

A lookup function 422 allows a user to identify and access one or more documents that are subject to a particular legal hold. In some implementations, the legal hold can be specified using the legal-hold area 418. Document information can be presented in an area 424. For example, the area 424 currently lists documents X, Y and Z, as indicated by identifiers 424A, B and C, respectively. The identifiers 424A-C can allow access to (e.g., by displaying) the documents, for example in form of read-only versions.

That is, the GUI 400 can be used by a cloud customer to maintain and manage the legal-hold information for that customer's specific data that is stored in the cloud. The GUI can present the documents covered by a legal hold together with additional metadata, such as creation date or author. In some implementations, documents can be grouped by incidents, such as by the reason for the legal hold.

Figure 5:
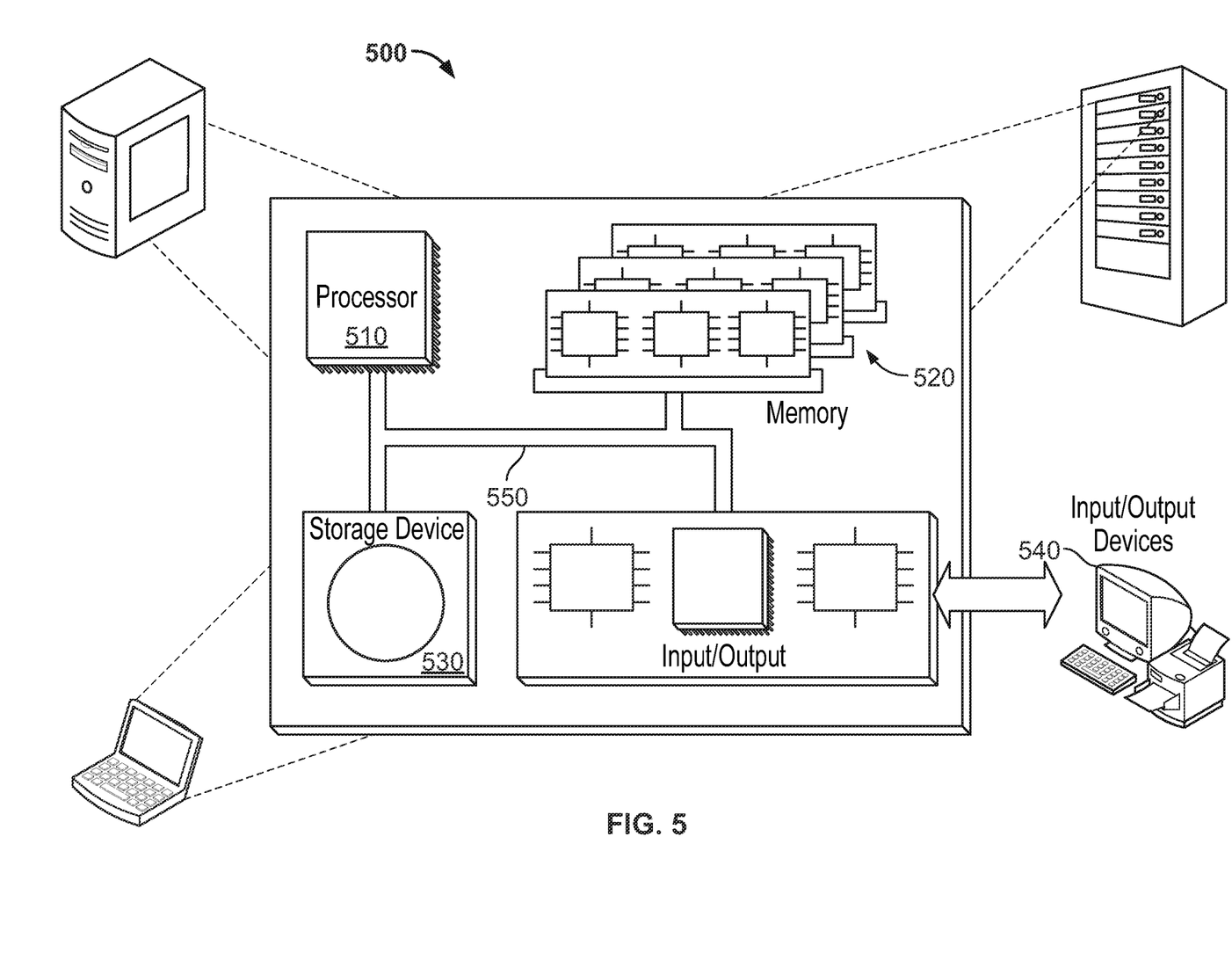
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for managing a legal hold on cloud documents, the method comprising:
   receiving, by one or more processors, legal-hold information in a legal-hold framework implemented on a cloud platform, the cloud platform configured to store documents and to perform services for multiple tenants, the legal-hold framework comprising a content management system and a plurality of services that include a legal-hold service, a first service, and a second service, wherein:
   (i) the first and second services are configured to allow the multiple tenants on the cloud platform to remotely manage documents stored on the cloud platform,
   (ii) the legal-hold service is configured to parse new documents that are uploaded to the cloud platform or that are created on the cloud platform in order to determine whether the new documents are covered by any legal hold that has been defined for a corresponding one of the multiple tenants on the cloud platform who created or uploaded the new document,
   (iii) the content management system is configured to manage document storage and metadata information in respective repositories for the multiple tenants on the cloud platform, the content management system arranged as a layer between the legal-hold service and the first service, but not as a layer between the legal-hold service and the second service, and
   (iv) the legal-hold information includes information that identifies at least:
      (a) one or more first documents stored on the cloud platform that are to be covered by a first legal hold so as to block the one or more first documents from being modified or deleted on the cloud platform while the one or more first documents are covered by the first legal hold,
      (b) one or more second documents stored on a registered computing system outside of the cloud platform that are to be covered by the first legal hold so as to block the one or more second documents from being modified or deleted on the registered computing system while the one or more second documents are covered by the first legal hold, the registered computing system being operated separately and independently from the cloud platform, and
      (c) a legal action associated with the first legal hold;
   in response to receiving the legal-hold information:
      (i) updating a legal-hold index stored on the cloud platform with respective identifiers for the one or more first documents and the one or more second documents to indicate that the one or more first documents and the one or more second documents are covered by the first legal hold,
      (ii) updating the metadata information with the information that identifies the legal action associated with the first legal hold,
      (iii) accessing registration information on the cloud platform for the registered computing system, and
      (iv) using the registration information to provide an alert to the registered computing system that the one or more second documents stored on the registered computing system outside of the cloud platform are covered by the first legal hold;
   receiving, by the legal-hold service and from the content management system, a call to perform a first legal-hold operation, wherein the content management system submits the call to perform the first legal-hold operation to the legal-hold service in response to a request that is to invoke the first legal-hold operation and that was submitted by the first service to the content management system, wherein the legal-hold service receives the call to perform the first legal-hold operation from the content management system rather than from the first service as a result of the content management system being arranged as the layer between the legal-hold service and the first service; and
   receiving, by the legal-hold service and from the second service, a call to perform a second legal-hold operation, wherein the call to perform the second legal-hold operation bypasses the content management system as a result of the content management system not being arranged as a layer between the legal-hold service and the second service.

2. The computer-implemented method of claim 1, further comprising presenting a graphical user interface using the legal-hold framework, and receiving an indication of user input entered through the graphical user interface that specifies the legal-hold information.

3. The computer-implemented method of claim 1, further comprising:
   receiving legal-hold release information in the legal-hold framework, the legal-hold release information indicating that documents covered by the first legal hold are to be released from the first legal hold; and
   in response to receiving the legal-hold release information in the legal-hold framework, removing the respective identifiers for the one or more first documents and the one or more second documents from the legal-hold index.

4. The computer-implemented method of claim 1, wherein the call to perform the first legal-hold operation comprises a first request to perform a modification or deletion of a first particular stored document, and wherein the call to perform the second legal-hold operation comprises a second request regarding a second particular stored document, the method further comprising:
   determining, by the legal-hold service, whether the legal-hold index includes an entry that identifies the first particular stored document;
   instructing, by the legal-hold service and in response to determining that the legal-hold index includes an entry that identifies the first particular stored document, the content management system to deny the first request;
   determining, by the legal-hold service, whether the legal-hold index includes an entry that identifies the second particular stored document;
   in response to determining that the legal-hold index includes an entry that identifies the second particular stored document, using the legal-hold service, and not the content management system, to deny the second request.

5. The computer-implemented method of claim 1, further comprising:
receiving a legal-hold lookup request in the legal-hold framework, the legal-hold lookup request identifying a particular legal hold;
in response to the legal-hold lookup request, obtaining identifiers from the legal-hold index for any documents covered by the particular legal hold; and
making the documents covered by the particular legal hold available to a user who submitted the legal-hold lookup request.

6. The computer-implemented method of claim 1, further comprising:
receiving, in the legal-hold framework, information indicating a new document type for the first legal hold; and
updating a document type registry with the received information.

7. The computer-implemented method of claim 1, further comprising:
implementing, in the legal-hold framework, a third service configured for uploading documents to, and accessing the documents in, another cloud platform; and
configuring, based on the received legal-hold information, the third service to update the legal-hold index regarding the documents and to check the legal-hold index before document modification or deletion.

8. A computer program product embodied in a non-transitory computer-readable storage medium and comprising instructions that when executed by a processor perform a method for managing a legal hold on cloud documents, the method comprising:
receiving, by one or more processors, legal-hold information in a legal-hold framework implemented on a cloud platform, the cloud platform configured to store documents and to perform services for multiple tenants, the legal-hold framework comprising a content management system and a plurality of services that include a legal-hold service, a first service, and a second service, wherein:
  (i) the first and second services are configured to allow the multiple tenants on the cloud platform to remotely manage documents stored on the cloud platform,
  (ii) the legal-hold service is configured to parse new documents that are uploaded to the cloud platform or that are created on the cloud platform in order to determine whether the new documents are covered by any legal hold that has been defined for a corresponding one of the multiple tenants on the cloud platform who created or uploaded the new document,
  (iii) the content management system is configured to manage document storage and metadata information in respective repositories for the multiple tenants on the cloud platform, the content management system arranged as a layer between the legal-hold service and the first service, but not as a layer between the legal-hold service and the second service, and
  (iv) the legal-hold information includes information that identifies at least:
    (a) one or more first documents stored on the cloud platform that are to be covered by a first legal hold so as to block the one or more first documents from being modified or deleted on the cloud platform while the one or more first documents are covered by the first legal hold,
    (b) one or more second documents stored on a registered computing system outside of the cloud platform that are to be covered by the first legal hold so as to block the one or more second documents from being modified or deleted on the registered computing system while the one or more second documents are covered by the first legal hold, the registered computing system being operated separately and independently from the cloud platform, and
    (c) a legal action associated with the first legal hold;
in response to receiving the legal-hold information:
  (i) updating a legal-hold index stored on the cloud platform with respective identifiers for the one or more first documents and the one or more second documents to indicate that the one or more first documents and the one or more second documents are covered by the first legal hold,
  (ii) updating the metadata information with the information that identifies the legal action associated with the first legal hold,
  (iii) accessing registration information on the cloud platform for the registered computing system, and
  (iv) using the registration information to provide an alert to the registered computing system that the one or more second documents stored on the registered computing system outside of the cloud platform are covered by the first legal hold;
receiving, by the legal-hold service and from the content management system, a call to perform a first legal-hold operation, wherein the content management system submits the call to perform the first legal-hold operation to the legal-hold service in response to a request that is to invoke the first legal-hold operation and that was submitted by the first service to the content management system, wherein the legal-hold service receives the call to perform the first legal-hold operation from the content management system rather than from the first service as a result of the content management system being arranged as the layer between the legal-hold service and the first service; and
receiving, by the legal-hold service and from the second service, a call to perform a second legal-hold operation, wherein the call to perform the second legal-hold operation bypasses the content management system as a result of the content management system not being arranged as a layer between the legal-hold service and the second service.

9. The computer program product of claim 8, the method further comprising presenting a graphical user interface using the legal-hold framework, and receiving an indication of user input entered through the graphical user interface that specifies the legal-hold information.

10. The computer program product of claim 8, the method further comprising:
receiving legal-hold release information in the legal-hold framework, the legal-hold release information indicating that documents covered by the first legal hold are to be released from the first legal hold; and
in response to receiving the legal-hold release information in the legal-hold framework, removing the respective identifiers for the one or more first documents and the one or more second documents from the legal-hold index.

11. The computer program product of claim 8,
wherein the call to perform the first legal-hold operation comprises a first request to perform a modification or deletion of a first particular stored document, and wherein the call to perform the second legal-hold operation comprises a second request regarding a second particular stored document, the method further comprising;

determining, by the legal-hold service, whether the legal-hold index includes an entry that identifies the first particular stored document;

instructing, by the legal-hold service and in response to determining that the legal-hold index includes an entry that identifies the first particular stored document, the content management system to deny the first request;

determining, by the legal-hold service, whether the legal-hold index includes an entry that identifies the second particular stored document;

in response to determining that the legal-hold index includes an entry that identifies the second particular stored document, using the legal-hold service, and not the content management system, to deny the second request.

12. The computer program product of claim 8, the method further comprising:

receiving a legal-hold lookup request in the legal-hold framework, the legal-hold lookup request identifying a particular legal hold;

in response to the legal-hold lookup request, obtaining identifiers from the legal-hold index for any documents covered by the particular legal hold; and making the documents covered by the particular legal hold available to a user who submitted the legal-hold lookup request.

13. The computer program product of claim 8, the method further comprising:

receiving, in the legal-hold framework, information indicating a new document type for the first legal hold; and updating a document type registry with the received information.

14. The computer program product of claim 8, the method further comprising:

implementing, in the legal-hold framework, a third service configured for uploading documents to, and accessing the documents in, another cloud platform; and configuring, based on the received legal-hold information, the third service to update the legal-hold index regarding the documents and to check the legal-hold index before document modification or deletion.

15. The computer-implemented method of claim 1, wherein:

the cloud platform is implemented according to a platform-as-a-service architecture in order to provide the multiple tenants with the ability to deploy particular applications from the cloud platform without owning or operating the cloud platform; and the plurality of services in the legal-hold framework are configured to receive requests from the multiple tenants through a representational state transfer-based application programming interface.

16. The computer-implemented method of claim 1, wherein the registered computing system is configured to block, in response to being provided the alert that the one or more second documents stored on the registered computing system outside of the cloud platform are covered by the first legal hold, the one or more second documents from being modified or deleted.

17. The computer-implemented method of claim 1, wherein the cloud platform is configured to allow particular ones of the multiple tenants to access the plurality of services in the legal-hold framework using different, tenant-customized user interfaces.

18. A computer-implemented system, comprising:

one or more processors; and one or more non-transitory computer-readable media having instructions stored thereon that, when executed by the one or more processors, cause performance of operations, comprising:

receiving, by one or more processors, legal-hold information in a legal-hold framework implemented on a cloud platform, the cloud platform configured to store documents and to perform services for multiple tenants, the legal-hold framework comprising a content management system and a plurality of services that include a legal-hold service, a first service, and a second service, wherein:

(i) the first and second services are configured to allow the multiple tenants on the cloud platform to remotely manage documents stored on the cloud platform, (ii) the legal-hold service is configured to parse new documents that are uploaded to the cloud platform or that are created on the cloud platform in order to determine whether the new documents are covered by any legal hold that has been defined for a corresponding one of the multiple tenants on the cloud platform who created or uploaded the new document, (iii) the content management system is configured to manage document storage and metadata information in respective repositories for the multiple tenants on the cloud platform, the content management system arranged as a layer between the legal-hold service and the first service, but not as a layer between the legal-hold service and the second service, and (iv) the legal-hold information includes information that identifies at least:

(a) one or more first documents stored on the cloud platform that are to be covered by a first legal hold so as to block the one or more first documents from being modified or deleted on the cloud platform while the one or more first documents are covered by the first legal hold, (b) one or more second documents stored on a registered computing system outside of the cloud platform that are to be covered by the first legal hold so as to block the one or more second documents from being modified or deleted on the registered computing system while the one or more second documents are covered by the first legal hold, the registered computing system being operated separately and independently from the cloud platform, and (c) a legal action associated with the first legal hold;

in response to receiving the legal-hold information:

(i) updating a legal-hold index stored on the cloud platform with respective identifiers for the one or more first documents and the one or more second documents to indicate that the one or more first documents and the one or more second documents are covered by the first legal hold, (ii) updating the metadata information with the information that identifies the legal action associated with the first legal hold, (iii) accessing registration information on the cloud platform for the registered computing system, and (iv) using the registration information to provide an alert to the registered computing system that the one or more second documents stored on the registered computing system outside of the cloud platform are covered by the first legal hold;

receiving, by the legal-hold service and from the content management system, a call to perform a first legal-hold operation, wherein the content management system submits the call to perform the first legal-hold operation to the legal-hold service in response to a request that is to invoke the first legal-hold operation and that was submitted by the first service to the content management system, wherein the legal-hold service receives the call to perform the first legal-hold operation from the content management system rather than from the first service as a result of the content management system being arranged as the layer between the legal-hold service and the first service; and receiving, by the legal-hold service and from the second service, a call to perform a second legal-hold operation, wherein the call to perform the second legal-hold operation bypasses the content management system as a result of the content management system not being arranged as a layer between the legal-hold service and the second service.

19. The computer-implemented method of claim 1, wherein:

the call to perform the first legal-hold operation comprises a request to upload, create, modify, or delete a first document that is covered by the first legal hold; and the call to perform the second legal-hold operation comprises a request to upload, create, modify, or delete a second document that is covered by the first legal hold.

* * * * *